United States Patent
Partyka et al.

(10) Patent No.: US 11,739,794 B2
(45) Date of Patent: Aug. 29, 2023

(54) CLAMP YOKE ERROR PROOFING DEVICE AND METHOD

(71) Applicant: Steering Solutions IP Holding Corporation, Saginaw, MI (US)

(72) Inventors: Michael E. Partyka, Saginaw, MI (US); Sergio R. Molinar, Freeland, MI (US); Carl R. Castanier, Saginaw, MI (US); David G. Matousek, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 671 days.

(21) Appl. No.: 16/666,891

(22) Filed: Oct. 29, 2019

(65) Prior Publication Data

US 2020/0140001 A1 May 7, 2020

Related U.S. Application Data

(60) Provisional application No. 62/754,132, filed on Nov. 1, 2018.

(51) Int. Cl.
*F16D 1/08* (2006.01)
*F16D 3/38* (2006.01)

(52) U.S. Cl.
CPC ........... *F16D 1/0864* (2013.01); *F16D 3/387* (2013.01); *Y10T 403/1624* (2015.01)

(58) Field of Classification Search
CPC ....... B62D 3/123; F16D 1/0864; F16D 3/387; Y10T 403/1616; Y10T 403/1624; Y10T 403/4614; Y10T 403/4617; Y10T 403/7033; Y10T 403/7182; Y10T 403/7088; Y10T 403/7188

USPC ........ 403/13, 14, 235, 236, 359.5, 398, 399; 464/135

See application file for complete search history.

(56) References Cited

U.S. PATENT DOCUMENTS

| | | | | |
|---|---|---|---|---|
| 4,537,523 A * | 8/1985 | Haldric | ................. | F16D 1/0864 403/12 |
| 5,647,686 A * | 7/1997 | Hancock | ............... | F16D 1/0864 403/359.5 |
| 7,241,068 B2 * | 7/2007 | Aota | ...................... | F16D 3/387 464/134 |
| 7,461,996 B2 * | 12/2008 | Kinme | .................... | F16D 3/387 403/236 |
| 7,488,134 B2 * | 2/2009 | Kinme | .................... | F16D 3/387 403/398 |
| 8,038,362 B2 * | 10/2011 | Kawanabe | .............. | F16D 3/387 403/235 |

(Continued)

FOREIGN PATENT DOCUMENTS

DE         19847526 A1 *   4/2000   ........... F16D 1/0864

*Primary Examiner* — Josh Skroupa
(74) *Attorney, Agent, or Firm* — Dickinson Wright PLLC

(57) ABSTRACT

A steering assembly includes a pinion shaft. The steering assembly also includes a yoke defining a space for axially receiving the pinion shaft and defining an access path for receiving a fastener that couples the pinion shaft to the yoke. The steering assembly further includes an error-proofing device fixed to the yoke and having a deflectable portion blocking the access path in an initial position and deflectable upon contact with the pinion shaft to be clear of the access path in a final assembly position to ensure that the pinion shaft is assembled to the yoke at a predetermined axial position.

6 Claims, 6 Drawing Sheets

(56) References Cited

U.S. PATENT DOCUMENTS

| 11,305,808 B2* | 4/2022 | Partyka | F16D 3/387 |
| 2014/0140759 A1* | 5/2014 | Bodtker | F16D 3/387 |
| | | | 403/322.2 |

* cited by examiner

CLAMP YOKE ERROR PROOFING DEVICE AND METHOD

CROSS-REFERENCE TO RELATED APPLICATION

This application claims priority to U.S. Provisional Patent Application No. 62/754,132, filed on Nov. 1, 2018, the disclosure of which is incorporated by reference herein in its entirety.

FIELD OF THE INVENTION

This disclosure generally relates to an assembly of one or more components, particularly assembly of a body of an automobile and a chassis, as well as methods associated therewith.

BACKGROUND

A typical assembly operation for an automobile includes the assembly of a vehicle body and chassis in different locations. In one or more locations, the vehicle body and the chassis are joined and the vehicle body is assembled onto the chassis. One of the systems that needs to be connected after the vehicle body and chassis are assembled is an intermediate shaft being coupled with a steering system, such as to a steering gear or to a rack and pinion.

To couple the intermediate shaft and the steering system, a clamp yoke in the intermediate shaft is attached to the steering system, for example, to a pinion shaft with a pinch bolt. Similar assembly is performed for other types of steering systems.

Due to the difficulty in accessing the pinch bolt and the amount of time allocated for this operation, it is a technical challenge for an assembly operator to accomplish the connection of the intermediate shaft and the steering system in a robust manner. There have been several cases where the operator tightened the pinch bolt to couple the pinion shaft with the intermediate shaft at a particular location only to find out later that the intermediate shaft and the pinion shaft are not correctly assembled. This in turn leads to an increase in the amount of time that is devoted to inspecting the connections of the intermediate shaft and the steering system. Further yet, even after such additional measurements performed during the inspection, instances have been reported where the two parts (steering shaft and pinion shaft) have become separated after the assembly.

SUMMARY

According to one aspect of the disclosure, a steering assembly includes a pinion shaft. The steering assembly also includes a yoke defining a space for axially receiving the pinion shaft and defining an access path for receiving a fastener that couples the pinion shaft to the yoke. The steering assembly further includes an error-proofing device fixed to the yoke and having a deflectable portion blocking the access path in an initial position and deflectable upon contact with the pinion shaft to be clear of the access path in a final assembly position to ensure that the pinion shaft is assembled to the yoke at a predetermined axial position.

According to another aspect of the disclosure, a machine includes a yoke. The machine also includes a shaft that is coupled to the yoke at a predetermined axial location, the yoke defining an access path for receiving a fastener that couples the shaft to the yoke. The machine further includes an error-proofing device fixed to the yoke and having a deflectable portion blocking the access path in an initial position and deflectable upon contact with the shaft to be clear of the access path in a final assembly position to ensure that the shaft is assembled to the yoke at the predetermined axial location.

According to yet another aspect of the disclosure, a method of assembling a steering assembly is provided. The method includes positioning a portion of an error-proofing device in an access path defined by a yoke. The method also includes inserting a pinion shaft into the yoke. The method further includes contacting the portion of the error-proofing device in the access path. The method yet further includes deflecting the portion of the error-proofing device to be out of the access path. The method also includes inserting a fastener through the access path to fix the axial position of the pinion shaft relative to the yoke.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1A:
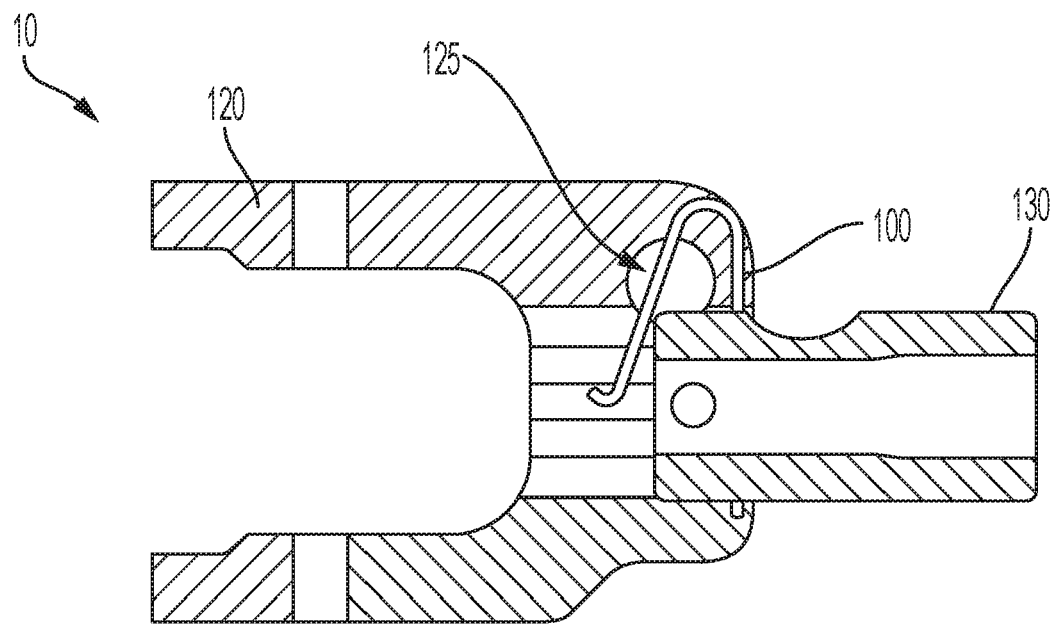
FIGS. 1A-1D illustrate a pinion shaft displacing the clamp yoke error-proofing device according to one aspect of the disclosure.
Figure 1B:
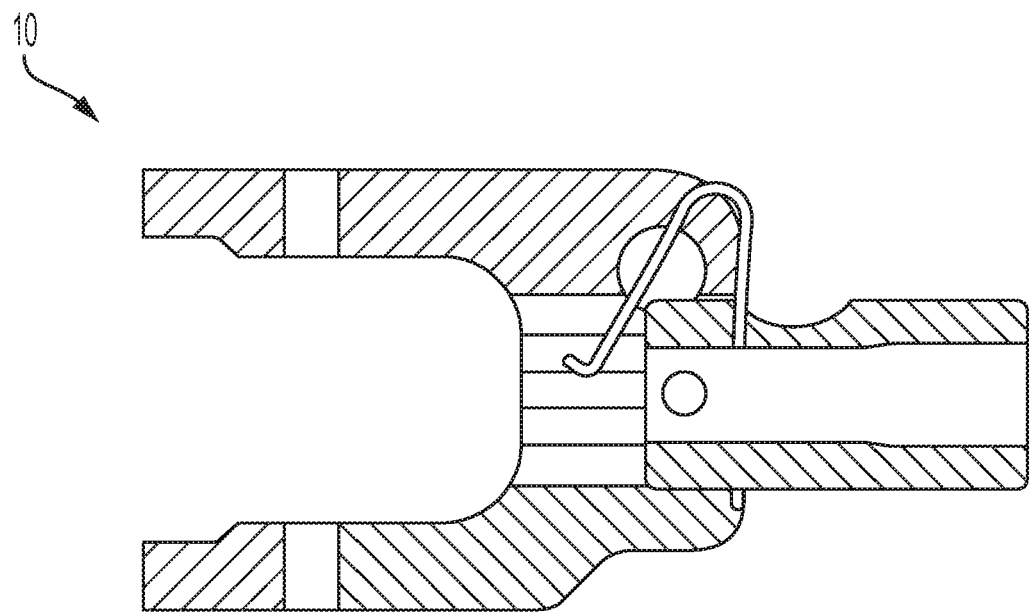
Figure 1C:
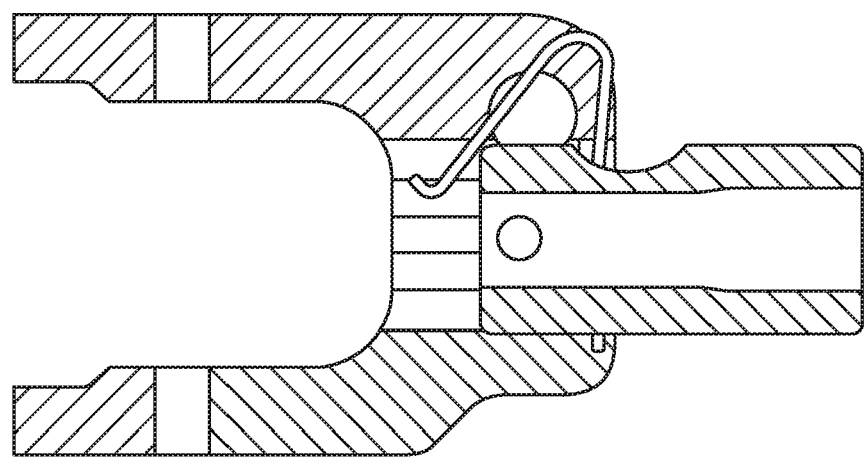
Figure 1D:
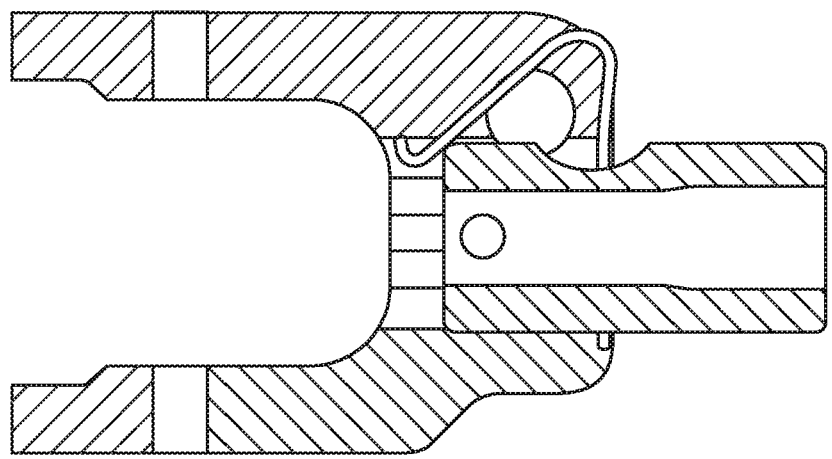

Referring now to the Figures, where the present disclosure will be described with reference to specific embodiments, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIGS. 1A-1D depict different views of an assembly 10 that includes an error-proofing device 100. The error-proofing device 100 may be used to assist with coupling of a steering shaft and a rack and pinion assembly of a steering system, as described herein. The assembly 10 includes a yoke 120 that is operatively coupled to a steering shaft (not shown) and is to be assembled to a pinion shaft 130 that is part of a rack and pinion assembly.

The yoke 120 defines a space for the pinion shaft 130 to be inserted for coupling to the yoke 120, and therefore the steering shaft. It is desirable to couple the pinion shaft 130 and the yoke 120 at a specific axial position of the pinion shaft 130. The embodiments described herein facilitate precise and reliable coupling at such a desired position.

FIGS. 1A-1D illustrate a progression of axial insertion of the pinion shaft 130 toward a desired axial position relative to the yoke 120. In particular, as the pinion shaft 130 advances axially (from FIG. 1A to 1D and beyond), the error-proofing device 100 is displaced to allow a fastener, such as a bolt (e.g., pinch bolt) to be passed through an access path 125 to the yoke 120. Once the pinion shaft 130 is in the correct location, that is, a predetermined distance inside the yoke 120, the access path 125 for the fastener is unrestricted, thereby leading to a connection in a desired position. The fastener (e.g., bolt) can be tightened to couple the pinion shaft 130 and the yoke 120 only when the error-proofing device 100 has moved to provide a clear path through the access path 125, ensuring an error-free assembly.

Figure 2:
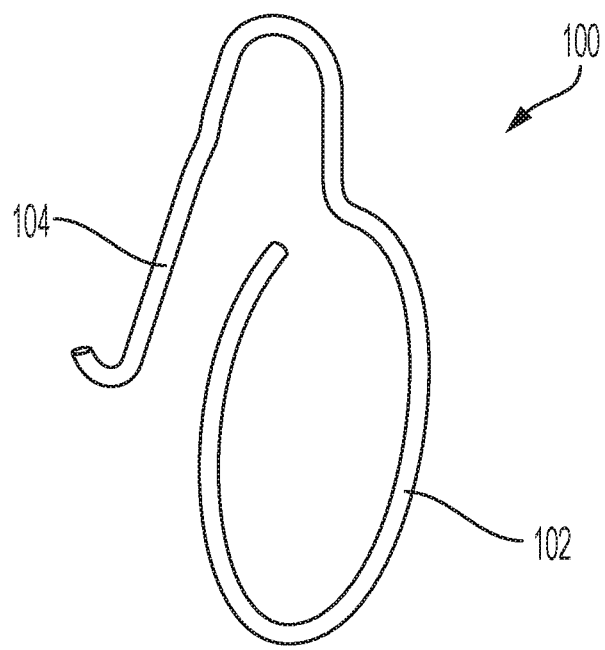
FIG. 2 illustrates a clamp yoke error-proofing device according to one aspect of the disclosure.

FIG. 2 illustrates an embodiment of the error-proofing device 100 in more detail. The error-proofing device 100 is a resilient member, such as a compression spring that may be formed of various contemplated materials. In some embodiments, the error-proofing device 100 is formed of spring steel. As shown, the error-proofing device 100 includes a ring portion 102 and a deflectable portion 104.

Figure 3:
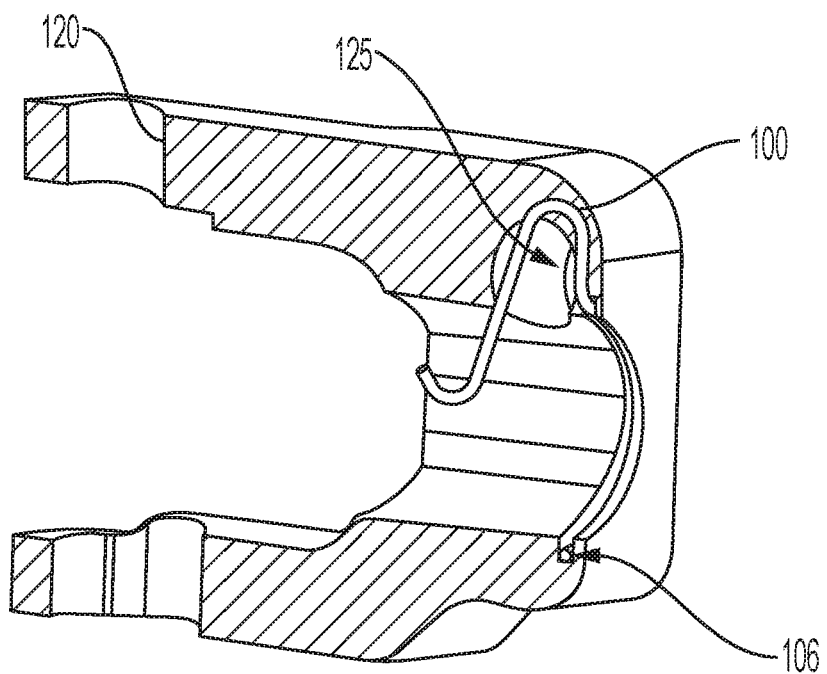
FIG. 3 illustrates the clamp yoke error-proofing device located in a yoke.
Figure 4:
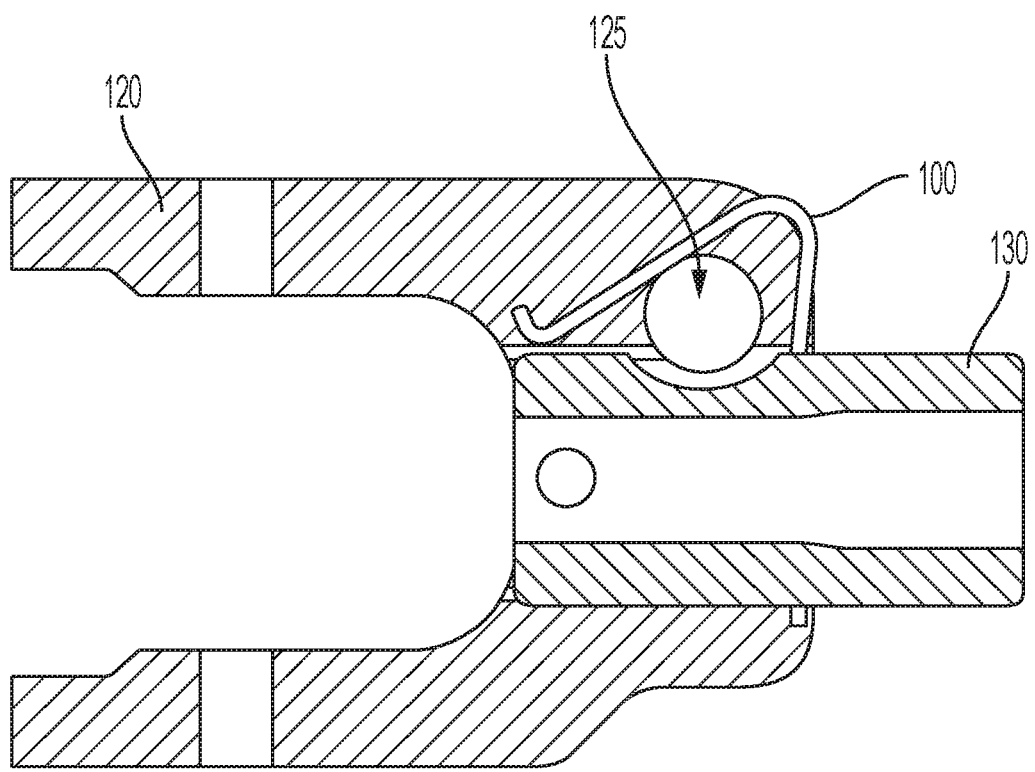
FIG. 4 illustrates the clamp yoke error-proofing device displaced in the yoke.

FIG. 3 shows the error-proofing device 100 installed in a portion of the yoke 120. The ring portion 102 of the error-proofing device 100 is located within a recess 106 that is substantially annular relative to the yoke space for the pinion shaft 130. The access path 125 is obstructed by the deflectable portion 104 of the error-proofing device 100 when the device 100 is initially installed in the yoke 120. As shown in FIGS. 1A-1D, the deflectable portion 104 is biased during axial installation of the pinion shaft 130. FIG. 4 illustrates the error-proofing device 100 fully moved to provide a clear path through the access path 125 for a bolt to be installed and tightened to couple the yoke 120 and the pinion shaft 130.

As described above, and as shown in FIG. 3, the error-proofing device 100 is held to the yoke 120 by the ring portion 102 that is held in the recess 106 of the yoke 120. The recess 106 may be any type of space that at least partially receives the ring portion 102 therein, such as a groove or the like. The ring portion 102 may extend any angular distance that is sufficient for desired retention. In one or more examples, the recess 106 is substantially at the predetermined location where the pinion shaft 130 is to be coupled with the yoke 120. In one or more examples, the geometry of the ring portion is fixed axially in a way that prevents the bolt installation. As the pinion shaft 130 advances into the yoke 120, the pinion shaft 130 pushes away the deflectable portion 104 and in turn clears the space 125 for the bolt.

Figure 6:
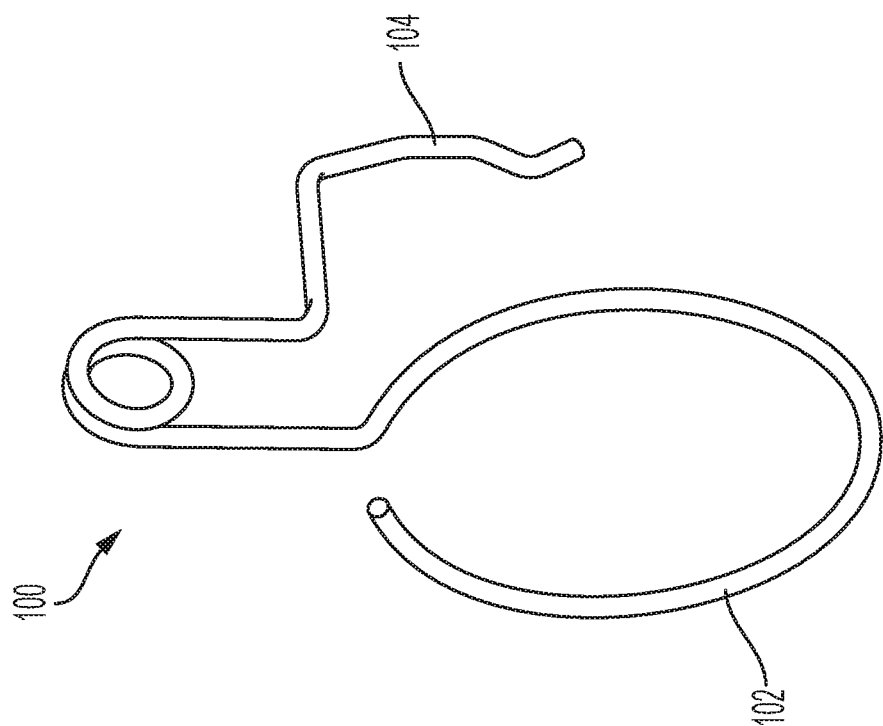
FIG. 6 illustrates the clamp yoke error-proofing device according to another aspect of the disclosure.
Figure 5:
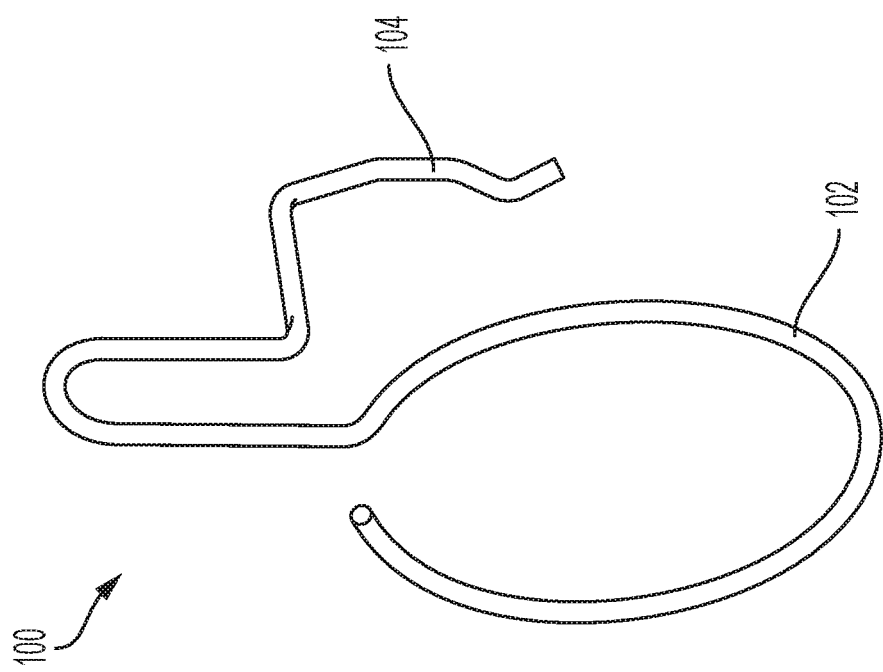
FIG. 5 illustrates the clamp yoke error-proofing device according to another aspect of the disclosure.
Figure 8:
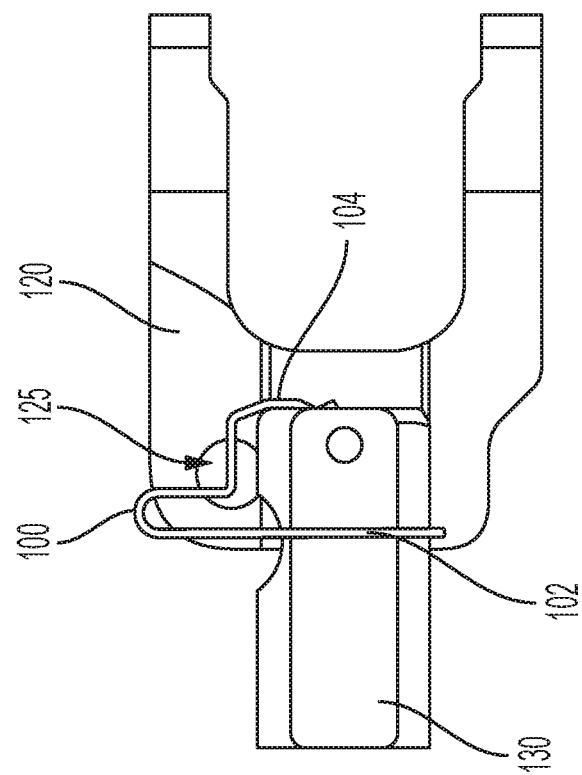
FIG. 8 is a sectional view of the pinion shaft displacing the clamp yoke error-proofing device of FIG. 5.
Figure 7:
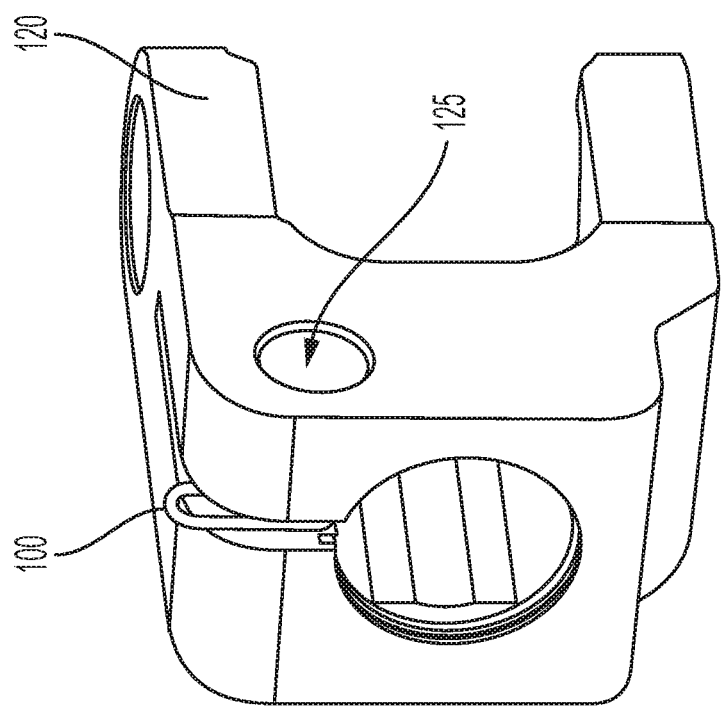
FIG. 7 illustrates the clamp yoke error-proofing device of FIG. 5 located in the yoke.

Although the error-proofing device 100 is illustrated in FIGS. 1-4 as having a specific geometry, it is to be appreciated that many other geometries are contemplated. By way of non-limiting example, FIGS. 5 and 6 illustrate two additional embodiments of the error-proofing device 100. As shown, these examples also include the ring portion 102 and the deflectable portion 104 to function in the same basic manner as that described above. FIGS. 7 and 8 show the embodiment of FIG. 5 assembled to the yoke 120. As shown, a ring plane that the ring portion 102 is located within is oriented substantially perpendicular to the deflectable plane that the deflectable portion 104 resides within.

The one or more embodiments of the technical solutions described herein facilitate a device that restricts a bolt path unless a pinion shaft is in a predetermined position ("correct" position). The device moves away as the pinion shaft 130 advances axially to the predetermined position. In addition to ensuring that the pinion shaft 130 is assembled at the correct position, the device 100 facilitates reducing effort during assembly operation of the pinion shaft 130 and the yoke 120.

In one or more examples, the device 100 does not need have to be removed after assembly, and the device 100 does not affect the yoke clamping characteristics. Accordingly, no additional efforts, changes, or adjustments are required and yet the technical solutions described herein addresses the technical challenges described herein.

The one or more embodiments of the technical solutions described herein address such technical challenges in the assembly of the intermediate shaft (steering shaft) and the pinion shaft 130. The technical solutions described herein facilitate such assembly, or coupling to be performed in a robust manner, and with reduced time requirement, not only for the assembly, but also for the inspection of the assembly.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering assembly comprising:
   a pinion shaft;
   a yoke defining a space for axially receiving the pinion shaft and defining an access path for receiving a fastener that couples the pinion shaft to the yoke; and
   an error-proofing device fixed to the yoke, the error-proofing device comprising a ring portion and a deflectable portion, the ring portion located within a recess defined by an inner wall of the yoke, the recess extending annularly around the inner wall, the deflectable portion blocking the access path in an initial position and deflectable relative to the ring portion upon contact with the pinion shaft to be clear of the access path in a final assembly position to ensure that the pinion shaft is assembled to the yoke at a predetermined axial position.

2. The steering assembly of claim 1, wherein the ring portion is located within a ring plane that is perpendicular to a plane that the deflectable portion is within.

3. The steering assembly of claim 1, wherein the error-proofing device is formed at least partially from spring steel.

4. A machine comprising:
   a yoke;
   a shaft that is coupled to the yoke at a predetermined axial location, the yoke defining an access path for receiving a fastener that couples the shaft to the yoke; and
   an error-proofing device fixed to the yoke, the error-proofing device comprising a ring portion and a deflectable portion, the ring portion located within a recess defined by an inner wall of the yoke, the recess extending annularly around the inner wall, the deflectable portion blocking the access path in an initial position and deflectable relative to the ring portion upon contact with the shaft to be clear of the access path in a final assembly position to ensure that the shaft is assembled to the yoke at the predetermined axial location.

5. The steering assembly of claim 4, wherein the ring portion is located within a ring plane that is perpendicular to a plane that the deflectable portion is within.

6. The steering assembly of claim 4, wherein the error-proofing device is formed at least partially from spring steel.

\* \* \* \* \*